July 5, 1960 M. ÖVROM SEM 2,943,985
APPARATUS AND METHOD FOR COLLECTING GAS FROM ALUMINUM FURNACES
Filed Oct. 22, 1957

INVENTOR.
MATHIAS ÖVROM SEM
BY
ATTORNEYS

United States Patent Office 2,943,985
Patented July 5, 1960

2,943,985

APPARATUS AND METHOD FOR COLLECTING GAS FROM ALUMINUM FURNACES

Mathias Övrom Sem, Smestad, Oslo, Norway, assignor to Elektrokemisk A/S, Oslo, Norway, a corporation of Norway Filed Oct. 22, 1957, Ser. No. 691,733

3 Claims. (Cl. 204—67)

The present invention relates to furnaces for the melt-electrolytic production of aluminum using the so-called Soederberg continuous anodes where the current is supplied to the anode by means of the vertical contact rods which also serve to support the anode. Such furnaces are illustrated, for example, in Jouannet Patent No. 2,526,857. As shown in that patent, such furnaces usually are provided with a permanent iron casing through which the electrode is gradually lowered as it is consumed during the electrolysis. The furnace gas is collected in a gas-collecting ring surrounding the iron casing near the bath surface. This gas ring has its outer wall adjacent the crust which is formed on the bath surface, and an approximately gas-tight packing is made between the crust and the ring by means of powdered aluminum oxide. As shown in the said Jouannet patent, the gas is collected from the gas ring and is usually led to a burner where its CO content is burned with air to form $CO_2$. At the same time, any tar fumes present will be burned. This combustion usually is effected with considerable excess of air so that the gas volume is increased up to as much as six times the volume developed in the furnace. After combustion the gas is led to a cleaning apparatus where it may be washed with water or a solution containing alkalies to remove dust and fluorine vapors so that the gas can be released into the atmosphere.

This system is extremely advantageous and valuable but it has the drawback that when the crust from time to time is broken so that more aluminum oxide can be introduced into the bath, an opening will be left for gas to escape and it is a fact that just at the time that the new oxide is to be introduced into the bath is the time when the evolution of fluorine vapors reaches a maximum, so that there is a substantial loss of these fluorine compounds. It has also been found that the packing between the gas ring and the crust does not form an entirely gas-tight connection. It has thus been found that in big plants there is a sufficient escape of fluorine compounds to pollute the atmosphere and cause damage in the neighborhood. Capturing and cleaning this gas has been found very difficult and expensive.

The present invention relates to apparatus for overcoming this difficulty and consists essentially in supplying a secondary gas ring above the primary gas ring and sucking the air out of this secondary ring so that gases escaping from the bath are sucked into the secondary ring. Such gas in the secondary ring is usually too much diluted with air to be combustible. However, this air can be used for mixing with the gas from the primary ring and the two are then burned together. On the other hand, if preferred, the gas may be led directly through collecting pipes to cleaning apparatus.

This invention may be readily understood by reference to the accompanying drawings in which.

In all of these figures, 10 represents the furnace pot provided with a lining 12. 14 is the fixed casing for the electrode which is here indicated at 16. The vertical contact rods 18 conduct current to the electrode and also support it, all as fully explained in the said Jouannet patent. 20 is the bath of alumina dissolved in cryolite under treatment and 22 is the layer of crust adjacent the sides of the bath.

Figure 1:
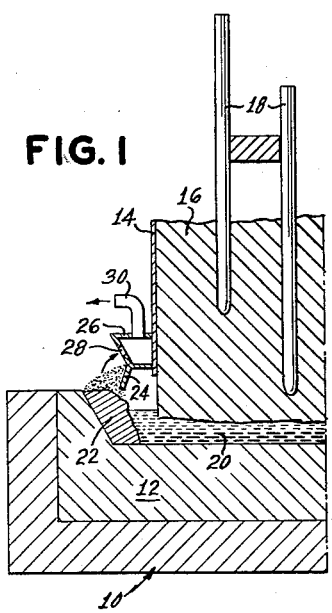
Fig. 1 is a sectional view through one-half of a furnace showing one form of secondary collecting ring positioned immediately above the primary collecting ring.

Referring now specifically to Fig. 1, 24 is the primary gas ring. It is understood that this may have an outlet pipe for withdrawal of gases as illustrated in the said Jouannet patent. Immediately above the primary gas ring 24 is a secondary gas ring 26 which overhangs the primary gas ring and is provided with a series of openings 28 for the sucking in of gases that escape from around the primary ring 24 or escape when the crust 22 is broken. These openings should be close enough together so that virtually all the surface of the pot is affected by the suction. One or more suction pipes 30 are provided leading out from the secondary ring 26. These are provided with any means of providing suction (not shown) such as a fan. Sufficient suction is applied to the pipe 30 so that a continuous flow of air will enter the openings 28 carrying with it virtually all of the gases that escape from around the ring 24. The amount of such suction may be varied over wide limits and may be sufficient so that there will be virtually no gas escape into the furnace room or very valuable results will be obtained if the suction is only great enough so that a major part of these escaped gases will be drawn into the auxiliary ring 26. By way of illustration, in a 100,000 ampere furnace having an anode measuring 6.5 x 2 meters, the gas and air sucked out of the secondary ring may be from one-half to one cubic meter (normal pressure) per second.

The gases withdrawn through the pipe 30 may be mixed with the gases withdrawn from primary ring 24 and burned or they may be withdrawn to any form of cleaning apparatus.

Figure 2:
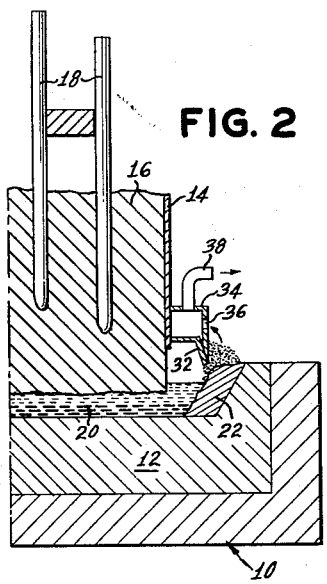
Fig. 2 is a view corresponding to Fig. 1 with a modified form of collecting ring also positioned immediately above the primary ring.

In Fig. 2 the primary collecting ring 32 is similar to the ring 24 but the secondary ring 34 is here shown as having a vertical outer face instead of an overhang as shown in Fig. 1. This ring also has a series of inlet apertures 36 and an outlet pipe 38. The operation is similar to that already explained in connection with Fig. 1.

Figure 3:
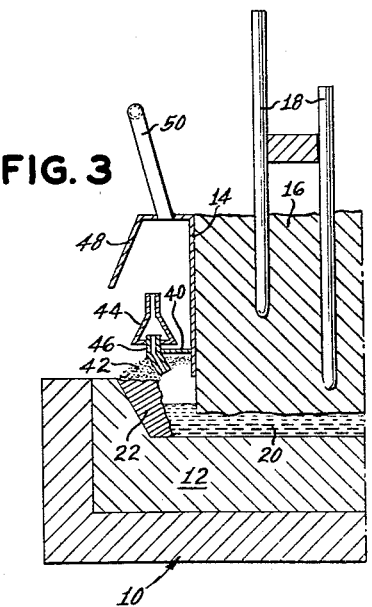
Fig. 3 is a view similar to Fig. 1 showing a secondary ring in the form of a hood member near the top of the casing and with a different form of connection between the primary ring and the crust.

In Fig. 3 the primary collecting ring is shown as being formed by the plate 40 and the alumina 42 packed on top of the crust 22. The burner is here shown at 44 connected with a pipe 46 which enters the space underneath the primary collecting ring. In this figure the secondary collecting ring is in the form of a hood 48 attached near the top of casing 14 and extending out so that it covers the entire open area of the pot. Suction to this ring may be supplied through one or more pipes 50 which withdraw the gases to any convenient cleaning point.

Figure 4:
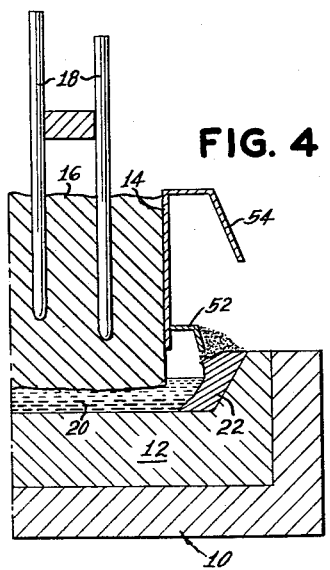
Fig. 4 is a view corresponding to Fig. 2 showing yet another form of construction.

Fig. 4 is similar to Fig. 3 but in this case the primary collecting ring 52 is similar to the primary collecting rings of Figs. 1 and 2 and the secondary collecting ring 54 has a hood-like member corresponding to member 48. It is understood that in this construction, as in Fig. 3, exhaust pipes will be supplied for the two collecting rings.

It will be noted that in all of these forms, a primary collecting ring is used which will collect gases and tar vapors in sufficient concentrations so that they may be burned with addition of air and ordinarily at a concentration above the explosive point, and a second collecting ring is supplied which will suck in other gases that may escape and prevent them from freely entering the atmosphere of the furnace room and at a concentration below the combustion point so that the two collections of gas may be blended to form a combustible mixture. In all of these cases it will be found advisable to have the secondary collecting ring or hood member strong enough so that the operators can stand on them for operating the furnace.

While I have referred to the secondary collecting member as being a "hood" member, it is to be noted that this member is very different from the type of hood or cover that is frequently used with aluminum furnaces and which runs right down to the edge of the pot. Such known hoods have to be opened for access to the furnace at the time that additional quantities of alumina are being introduced and as has already been pointed out it is just at this time that the evolution of gases is at its maximum. In my case a substantial space is in all cases left between the edge of the secondary gas collecting member and the periphery of the pot. This space is ample for the practically free escape of gases into the room, but such escape is avoided by the suction within the secondary gas channel which draws the major portion of these gases into the channel and prevents their escape.

What I claim is:

1. In an aluminum reduction furnace of the type having a pot adapted to receive a bath of cryolite and alumina, a casing above the bath adapted to hold and guide an electrode and vertical control studs running down inside the casing adapted to enter the electrode to support the same and conduct current to it, means for collecting gases generated around the electrode comprising a member running around the electrode extending out from the casing adapted to be sealed by alumina relative to the top of a bath in the pot to form a substantially gas-tight seal between such member and the bath whereby gases can be collected below such member and adjacent the electrode at a concentration above the explosive point, a second member also extending out above such casing above said first member to form a channel having open areas through which gases can be sucked into such channel and suction means whereby air and escaped furnace gases can be collected into a second channel at a concentration below the explosive point, said second member being so positioned that a large open area is left between said member and the outer periphery of the furnace pot through which access can be had for working on the surfaces of the charge in the pot and through which gases might escape except for the suction means whereby such gases are collected into the said second channel.

2. A structure as specified in claim 1 in which said second member is immediately above the first member, and with said first member forms a substantially enclosed channel provided with a series of apertures opening toward the outer periphery of the pot through which gas escaping outside of said first member can be sucked into said upper channel.

3. The method of operating an aluminum reduction furnace of the type having a pot adapted to receive a bath of cryolite and alumina, a casing above the bath adapted to hold and guide the electrode and vertical control studs running down inside the casing adapted to enter the electrode to support the same and conduct current to it, which comprises collecting the gases that escape from under the electrode immediately adjacent the bottom edges of said electrode and in a concentration above the explosive point, and separately collecting with substantial quantities of air the gases that escape from the bath at areas more removed from the electrode than said first gases whereby said latter gases are collected at a concentration below the combustion point, and thereafter burning said gases jointly.

References Cited in the file of this patent

UNITED STATES PATENTS

| | | |
|---|---|---|
| 2,061,146 | Ferrand | Nov. 17, 1936 |
| 2,731,407 | Sem et al. | Jan. 17, 1956 |
| 2,769,113 | Graybeal | Oct. 30, 1956 |